United States Patent [19]
Geymond et al.

[11] Patent Number: 5,752,253
[45] Date of Patent: May 12, 1998

[54] PROCESS AND DEVICE FOR THE AUTOMATIC GENERATION OF SPREADSHEETS

[75] Inventors: Jean Paul Geymond, Clamart; Massimo Paltrinieri, Paris, both of France

[73] Assignee: Bull, S.A., Paris, France

[21] Appl. No.: 495,963

[22] Filed: Jun. 28, 1995

[30] Foreign Application Priority Data

Jun. 28, 1994 [FR] France ............................. 94 07909

[51] Int. Cl.⁶ .................................................. G06F 17/30
[52] U.S. Cl. .................................. 707/503; 707/2; 707/3
[58] Field of Search .......................... 395/335, 936–939, 395/611–615, 602–603, 764, 765, 770, 774, 776–778; 707/102, 501, 503–504, 903, 515–516

[56] References Cited

U.S. PATENT DOCUMENTS

| | | | |
|---|---|---|---|
| 5,317,686 | 5/1994 | Salas et al. .............................. | 395/764 |
| 5,379,423 | 1/1995 | Mutoh et al. ............................. | 395/620 |
| 5,487,144 | 1/1996 | Takahashi et al. ....................... | 395/348 |
| 5,499,371 | 3/1996 | Henninger et al. ....................... | 395/702 |
| 5,515,267 | 5/1996 | Alsenz ..................................... | 364/188 |
| 5,553,212 | 9/1996 | Etoh et al. ................................ | 395/140 |
| 5,560,005 | 9/1996 | Hoover et al. ............................ | 395/610 |
| 5,604,892 | 2/1997 | Nuttal et al. .............................. | 395/500 |

*Primary Examiner*—Joseph H. Feild
*Assistant Examiner*—Rudolph Buchel
*Attorney, Agent, or Firm*—Kerkam, Stowell, Kondracki & Clarke, P.C.; Edward J. Kondracki

[57] ABSTRACT

The invention relates to a process for automatic generation of spreadsheets from a model of the entity-relationship type which serves as a support for a relational data base. This data base module of the entity-relationship type is shown on a screen of an information system in the form of a graph composed of a plurality of entities and relationships which is physically embodied in memory by a set of relational tables. According to the invention, a spreadsheet is automatically defined by the selection from this graph of the elements intended to compose its abscissa and ordinate data and the contents of the cells thus formed.

14 Claims, 6 Drawing Sheets

DEPT — 201

| DEPT # | NAME DEPT |
|---|---|
| 2 | IMAGE 1 |
| 3 | CAD1 |
| 1 | KEYBOARD |
| 4 | MONITOR |
| ... | ... |

EMPLOYEE — 201

| EMPL_NAME | EMPL_AGE | EMPL_SECU |
|---|---|---|
| e1 | 35 | 54231632 |
| e7 | 27 | 65782391 |
| ... | ... | ... |

WORKS — 201

| EMPL_NAME | DEPT # |
|---|---|
| e1 | e1 |
| e7 | 4 |
| ... | ... |

PRODUCT — 201

| PROD_NAME | PROD_RET | PROD_TYPE |
|---|---|---|
| OFFICE AUTOMATION | 2A83 | OFFICE AUTOMATION |
| GRAPHICS | 32X40 | GRAPHICS |
| ... | ... | ... |

| OFFICE AUTOMATION | GRAPHICS |
|---|---|

FIG. 4A

| OFFICE AUTOMATION | | GRAPHICS | |
|---|---|---|---|
| DEPT 1 | DEPT 2 | DEPT 3 | DEPT 4 |

FIG. 4B

| OFFICE AUTOMATION | | | | GRAPHICS | | |
|---|---|---|---|---|---|---|
| DEPT 1 | | DEPT 2 | | DEPT 3 | | DEPT 4 |
| e1 | e2 | e3 | e4 | e5 | e6 | e7 |

FIG. 4C

| | OFFICE AUTOMATION | | | | GRAPHICS | | |
|---|---|---|---|---|---|---|---|
| | DEPT 1 | | DEPT 2 | | DEPT 3 | | DEPT 4 |
| | e1 | e2 | e3 | e4 | e5 | e6 | e7 |
| AGE | | | | | | | |

FIG. 4D

|  | | OFFICE AUTOMATION || | GRAPHICS ||
| --- | --- | --- | --- | --- | --- | --- |
|  | | DEPT 1 | DEPT 2 | | DEPT 3 | DEPT 4 |
|  | | e1 | e2 | e3 | e4 | e5 | e6 | e7 |
| Age | | | | | | | | |
| SALARY | NET | | | | | | | |
|  | GROSS | | | | | | | |

FIG. 4E

|  | | OFFICE AUTOMATION || | GRAPHICS ||
| --- | --- | --- | --- | --- | --- | --- |
|  | | DEPT 1 | DEPT 2 | | DEPT 3 | DEPT 4 |
|  | | e1 | e2 | e3 | e4 | e5 | e6 | e7 |
| Age | | | | | | | | |
| SALARY | NET | | | | | | | |
|  | GROSS | | | | | | | |
| COMPETENCY | TYPE | | | | | | | |

PROCESS AND DEVICE FOR THE AUTOMATIC GENERATION OF SPREADSHEETS

FIELD OF THE INVENTION

The present invention relates to a process and a device for the automatic generation of spreadsheets from the graphic representation of an entity-relationship model, for example of the structure of a company, that serves as a support relational data base, with a view to their utilization in a spreadsheet program, the this process and the device being associated with this program, and in this very way facilitating the creation of these spreadsheets and the process of decision-making.

DESCRIPTION ON RELATED ART

Spreadsheet programs, which exist in numerous software formats, are currently used for their capacity to manage large spreadsheets, rather like sophisticated calculators. They are rarely used, however, to assist in decision-making, which requires efforts to synthesize problems to be solved or studied. In fact, the disadvantage of these spreadsheet programs is that they do not allow visual interaction with the source data and the relationships which link them to one another, and therefore do not allow the definition of spreadsheets while remaining close to the same structure of the application field.

On the other hand, relational database management systems (RDBMS) are known which manage tables containing, for example, the data of a company. An extension of these RDBMSs consists of a model called an entity-relationship model, which makes it possible to represent, in the form of a graph, the structure of the data memorized by showing the subjacent relationships between each type of data.

SUMMARY OF THE INVENTION

A first object of the invention is to eliminate the clumsiness in the utilization of these spreadsheet programs, and the difficulties in designing a spreadsheet, by means of a process for the automatic generation of spreadsheets which is simple to implement and which makes it possible to define the elements to be taken into account in this spreadsheet easily and visually with the aid of graphs of the entity-relationship type.

This object is achieved in that the process for the automatic generation of spreadsheets from a model of the entity-relationship type which serves as a support for a relational database, this database model of the entity-relationship type being displayed on the screen of an information system in the form of a graph composed of a plurality of entities and relationships represented respectively by first and second types of objects and linked by lines, this graph being physically embodied in memory by a set of relational tables, is characterized in that:

a spreadsheet is automatically defined by the selection, from among the various types of objects in this graph, of elements which are intended to compose the abscissa and ordinate data and the contents of the cells thus formed.

In a first mode of implementation of the process according to the invention, the selection of the elements which compose a spreadsheet is characterized by:

a first phase for the selection of a first set of entities such that the path formed by these entities and the relationships which link them do not include any loops, one of the ends of this path being designated as the root and the other as the branch, a second phase for the selection of a second set of entities linked by relationships to the branch, and in that, for each of the entities in the first set, when it is indicated for selection, a list of its attributes is displayed, from among which at least one attribute is selected, and in that for each of the attributes selected, the values of these attributes, which are extracted from the database, plotted on the abscissa, in hierarchical levels corresponding to a tree structure between the entities of the abscissas, and in that a list of the non-selected attributes of this branch entity and a list of the attributes of the entities in the second set are displayed, from among which at least one attribute is selected, in that these attributes are plotted on the ordinate on hierarchical levels corresponding to a tree structure between the entities of the ordinates, and in that the cells thus formed are initialized with the values of these attributes extracted from the data base.

In a variant mode of implementation of the process according to the invention, it is possible to show in the graph the attributes of the entities and relationships which compose it, in the form of objects of a third type, and to select them directly.

In another variant mode of implementation of the process according to the invention, the range of the values assumed by the attributes to be plotted on the abscissa can be limited by pinpoint choices or by limitation functions.

In one characteristic of the mode of implementation of the process according to the invention, all the objects which form the graph are at first displayed in a first color, then in the course of the selection, the objects selected are displayed in a second color.

In another characteristic of the mode of implementation of the process according to the invention, at every moment in the selection phases, the objects which may to be selected are displayed in a third color.

In another characteristic of the mode of implementation according to the invention, these colors can be replaced by variations in brightness or by blinking frequencies.

In another variant mode of implementation of the process according to the invention, the selection is characterized in that it includes a step for the validation of the current entity selected in order to verify:

during the first phase, whether a relationship links this entity in the graph to the previously selected entity, and in the second phase, whether a relationship links this entity in the graph to the branch, these relationships being physically embodied in memory by tables which make it possible to effect, at the level of the RDBMS, a joining of the tables corresponding to these entities.

In another variant mode of implementation of the process, it is characterized by the constitution of a historical report of the selections which contain each of the selection steps and which make it possible to backtrack, step by step.

In yet another variant mode of implementation of the process according to the invention, this model includes the expression of constraints with which the various entities and relationships constituting it comply, and the constraints associated with the entities and relationships selected are automatically linked to the cells of the spreadsheets thus generated.

In another characteristic of the mode of implementation of the process according to the invention, this model is a model of a company.

Another object of the invention is to propose a system to assist in decision-making which simplifies the generation of spreadsheets for the purposes of simulation, or graphic representations of statuses or developments, a determining step in forecasting the impact of decisions.

This object is achieved thanks to a system to assist in decision-making from a model of the application field in the form of an entity-relationship graph containing entities, relationships and constraints which are linked to them, which includes:

storage means for a database described by this model which contains the pieces of information corresponding to this application field,
  means for the graphic representation on a screen of this entity-relationship graph, which includes objects representing entities, relationships, constraints which are linked to them, and lines which link these objects to one another,
  and which is characterized by:
  interface means which allow the selection from the graph of the entities and the relationships which describe the elements to be considered during the decision-making study,
  means for the automatic generation of spreadsheets which have a structure corresponding to the entities and relationships selected and which associate the constraints present in the model with their cells,
  means for overlaying the values contained in the database which correspond to the elements selected in order to initialize these spreadsheets,
  and means for converting the spreadsheets created into the format of a spreadsheet program with a view to their utilization in this spreadsheet program, which allow the presentation of the data in the form of graphics and of the simulations which comply with the constraints, for the purposes of utilizing the data and forecasting the impact of decisions.

In one variant of the system to assist in decision-making according to the invention, it includes means for saving a historical report of the selections and means for utilizing this historical report which make it possible to backtrack, step by step, through the selections made and thereby modify the structure of a spreadsheet.

DESCRIPTION OF THE DRAWINGS

Other characteristics and advantages of the present invention will appear more clearly with a reading of the description below, made in reference to the appended drawings, in which.

DESCRIPTION OF THE PREFERRED EMBODIMENTS

Figure 1:
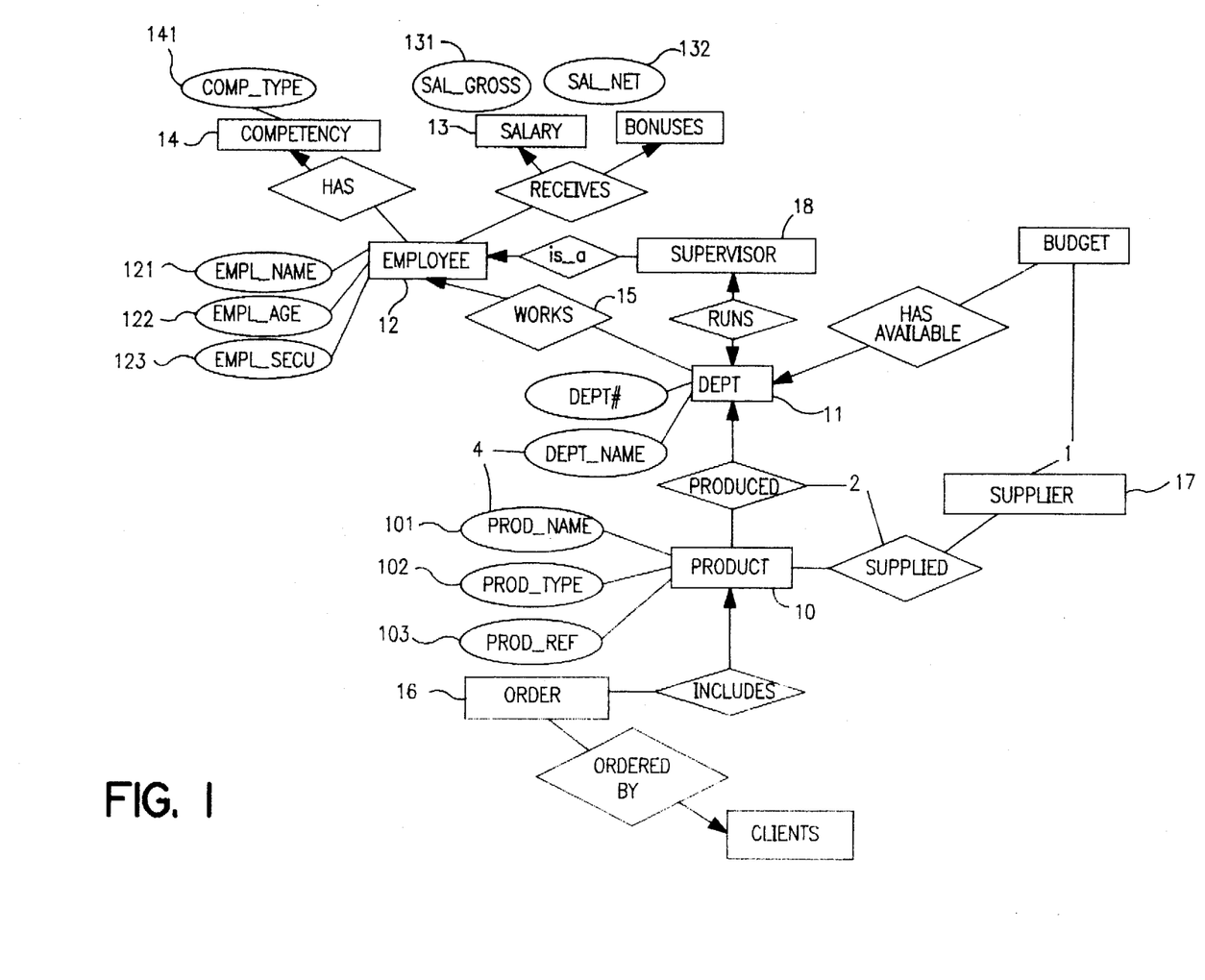
FIG. 1 represents a simplified example of an entity-relationship model which graphically describes the structure of a company.
Figure 2A:
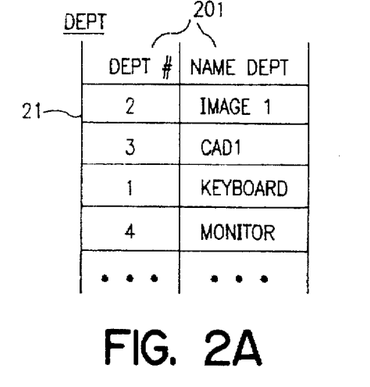
FIG. 2 represents several tables in a relational database which correspond to the model of the company in FIG. 1.
Figure 2B:
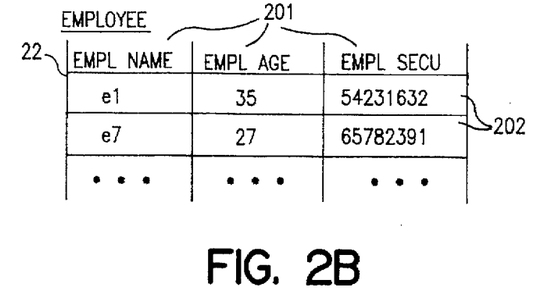
Figure 2C:
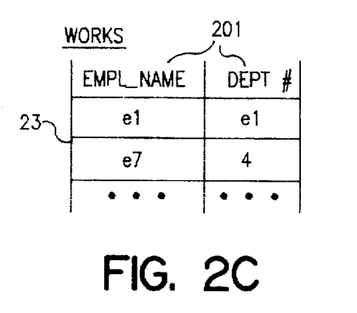
Figure 2D:
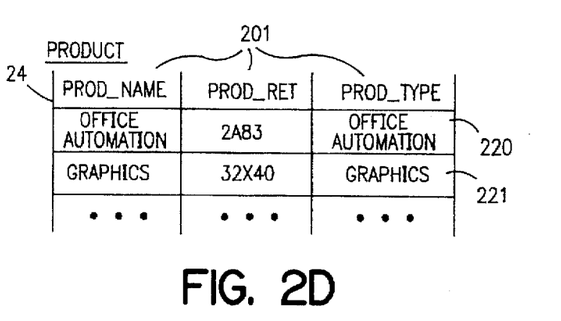

Multiple efforts have been made in the past to define a relational model, called an entity-relationship model, which makes it possible to more easily describe the elements to be taken into account in a relational database. FIG. 1 shows an example of such a representation, the application field chosen here being a company, in which the entities 1 (of rectangular shape) and the relationships 2 (of diamond shape) are linked to one another by pointer lines. The attributes 4 (of elliptical shape) which relate to these entities and relationships can appear in the graph. For greater clarity, only a few of the attributes have been represented in the graph in FIG. 1.

Methods which make it possible to create a relational database from such graphs are known in the prior art, and the reader will most particularly be referred to the book by J. D. Ullman, "Principles of Database and Knowledge Base Systems," Volume 1, published in 1988 by Computer Science Press publications, these techniques being subsequently considered accessible to one skilled in the art. A relational database corresponding to the graph in FIG. 1 therefore manages a certain number of tables (called relation tables) as represented in FIG. 2, in which the columns correspond to the attributes 201 and the rows to the tuples 202. It can be seen, for example, that the entity DEPT (reference 11 in FIG. 1), which represents the various departments in a company, corresponds to a table DEPT (reference 21 in FIG. 2), that the entity EMPLOYEE (reference 12 in FIG. 1), which represents the employees of this company, corresponds to a table EMPLOYEE (reference 22 in FIG. 2), and that the relationship Work (reference 15 in FIG. 1), which illustrates the fact that employees work in a department, corresponds to the table WORK (reference 23 in FIG. 2). The relation DEPT 21 contains a certain number of tuples 202 which have as their attributes 201 a department number dept# and the name of this department dept_name. It is the same for the relation EMPLOYEE 22 whose attributes empl-name, empl-age and empl-secu, respectively represent, for each tuple in this relation, an employee name, an age and a social security number.

In one mode of implementation of the process according to the invention, a menu of principal commands includes a loading option for an entity-relationship model which makes it possible to load into memory the model with which one desires to work. Typically, a dialogue box then makes it possible to enter the name of a file in which this model is stored in an adequate form. A graph similar to that in FIG. 1 is then displayed in a window. A menu which includes the display options then offers various possibilities: for example, caching all the attributes in order to avoid an overload, or else to display them all on the screen in order to allow their direct selection. In another mode, only the attributes selected during the selection phase remain visible. The colors of the objects represented (selected, able to be selected, or inactive) can also be initialized. Likewise, it is possible to allow navigation to the right, left, top or bottom if the size of the graph does not allow it to be displayed in its entirety on the screen. This allows greater readability of the graph and assures that all its elements will be accessible for the manipulations which make it possible to create a spreadsheet.

The selections are made by means of a keyboard or a pointing/clicking object, for example a computer mouse, by positioning a pointer on the object to be selected and validating/clicking on it. In one mode of implementation, formalized by the program for processing the selection actions, the left button of the mouse will be reserved for a new selection, while the right button will cancel the last operations one by one, going back along a historical report.

Figure 3A:
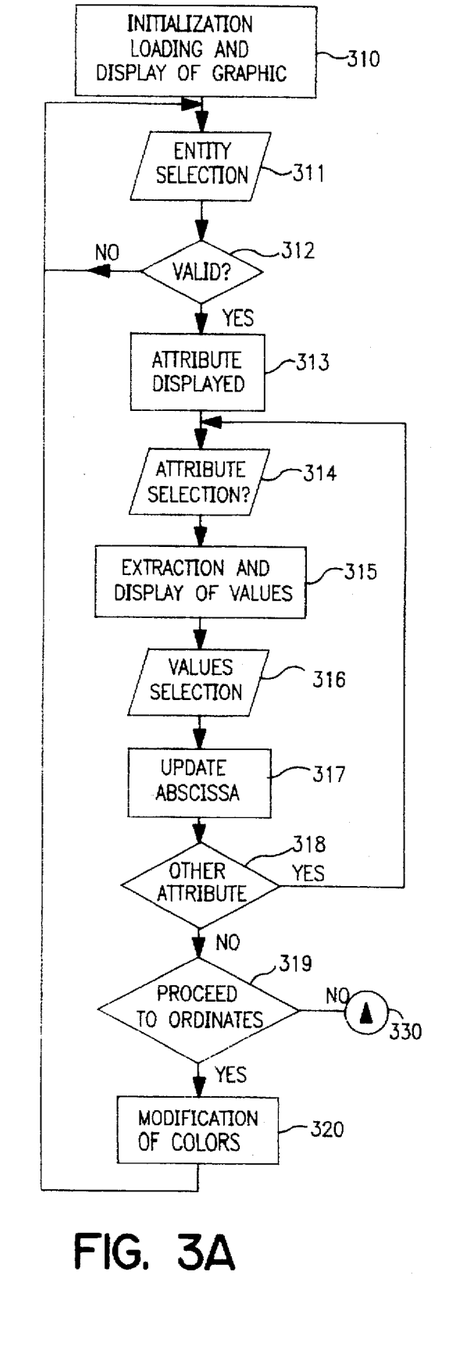
FIGS. 3a and 3b represent a flow chart of the various steps in the implementation of the process for generating a spreadsheet from an entity-relationship model.
Figure 3B:
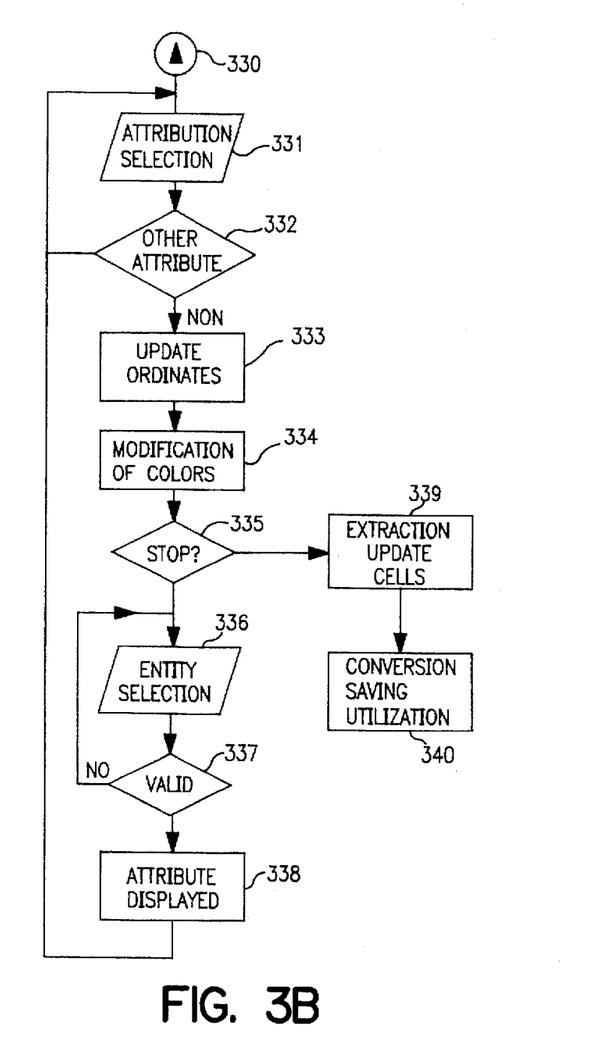

FIG. 3 describes in flow chart form the various steps which lead to the generation of a spreadsheet. Here the parallelograms designate the steps in the selection of objects. The first step is the initialization of the process during which the user designates the model with which he desires to work and for which the graphic representation is then displayed in a window. The first selection phase can then begin.

The first entity selected in step 311 is designated as the root of the new spreadsheet. A validation step 312 makes it possible to assure that the object selected is indeed an entity which is valid as a root from the start, or beginning with the second selection, that it is linked by a relationship to the preceding entity selected. Thus, the elements to plot on the abscissa as described below are necessarily linked logically, since together they form a string which does not include any loops after the root. If the entity selected is valid, the selection phase can continue; if not, this entity is rejected and the process resumes at step 311.

If the display mode chosen is that in which no attributes are displayed, the process then proceeds to step 313, which consists of directly displaying all the attributes of the current entity to which the user has authorized access. The display can be made by completing the graph, as with the attributes which appear in FIG. 1, or in a temporary window opened for this purpose. If, on the contrary, all the attributes are already displayed, the process proceeds directly to step 314.

This step 314 allows the user to select one of these attributes. Step 315 then entails extracting from the database subjacent to the graphic model the values assumed by the tuples contained in the (relation) table which correspond to the current entity in the column corresponding to the attribute selected and displaying them in a window, for example of the scrolling type (scrolling windows). This is a function of the management of the databases and depends on the RDBMS installed. A request in the language of the RDBMS, SQL for example, makes it possible to overlay these data.

Step 316 allows the user to select all or part of the field of this attribute. The user can either click on the values which are of interest within the scope of his problem, or enter a numerical or alphanumeric condition in a dialogue box provided for this purpose in the window for selecting the values. Simple selection functions which use the operators =, >, <, >=, <= are authorized in order to select a set of responses. An example of the utilization of these functions will be explained in the description which follows.

Figure 4A:
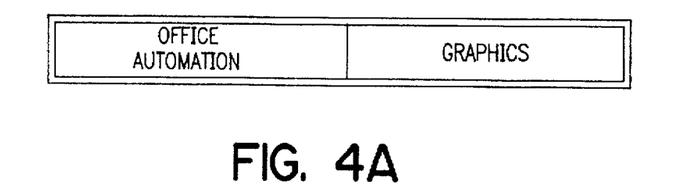
FIGS. 4a through 4f represent the results of the steps for creating a spreadsheet according to the process of the invention.
Figure 4B:
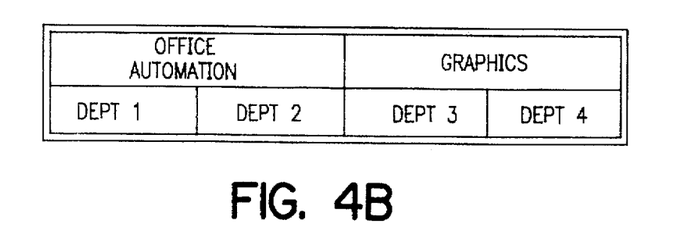
Figure 4C:
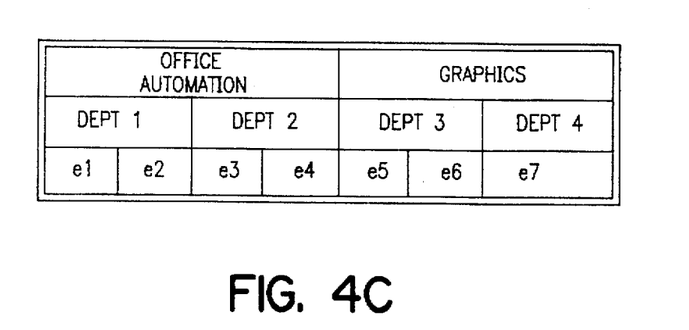

Once selected, these memorized values are plotted on the abscissa in the spreadsheet being created, the status of which is constantly displayed in a control window by means of a display routine. This report is carried out in the following manner:

for the root, at a first level (see FIG. 4a)

for the subsequent abscissa entities, at lower levels, in conformity with the example in FIGS. 4b and 4c.

The window for selecting the values is then closed. Moreover, the current attribute is withdrawn from the list of the attributes that it is possible to select: if this is then empty, the process proceeds directly to step 319.

If, in step 318, the user decides to select another attribute, the process resumes at step 314. Otherwise, he must again choose, in step 319, whether to proceed to the elements to be plotted on the ordinate, or to continue the phase of determining abscissas. In the first case, the process continues on its course at step 330, from which point forward the current entity is called the branch; in the opposite case, the process proceeds to step 320.

In step 320, the color of the current entity is modified in order to visualize the selection and the window for displaying its various attributes is closed. In the display mode in which the attributes are represented in the graph, the color of the attributes selected is modified in the same way. Moreover, the objects which represent entities linked to this current entity by relationships but which have not yet been selected take on a third tint, in order to clearly indicate to the user the choices available. Other marking methods, such as highlighting, video inversion, or blinking make it possible to achieve the same objective. The selection can then be followed by a wraparound to step 311.

Figure 4D:
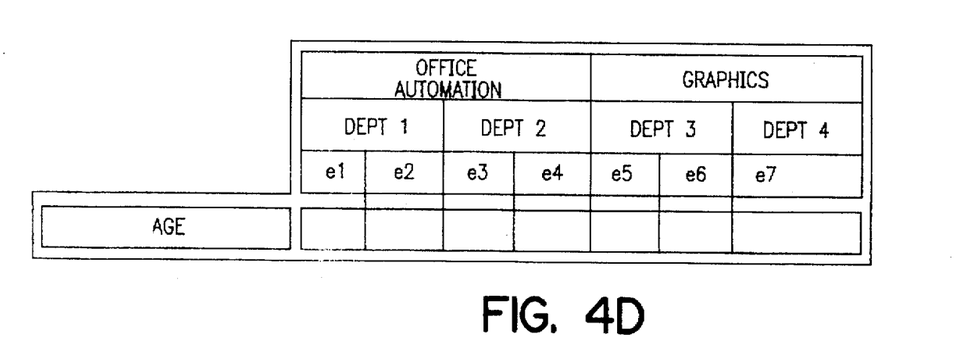

Step 330 leads to step 331 which, in a wraparound with step 332, makes it possible to select from among the attributes remaining in the branch those which must appear as ordinates. When the user has terminated this selection, the ordinates of the spreadsheet are memorized, then added to the control window accordingly in step 332, as in FIG. 4d. The colors of the objects of the graph are then modified as in step 320, the branch being considered as the current entity.

It is then possible, either to stop the selection and proceed with step 339, or to select another entity in step 336. In the latter case, it is necessary to verify (step 337) the validity of this entity, the condition now being that it be linked to the branch by a relationship. If the entity is valid, its attributes are displayed in step 338 just as during step 313, and the process wraps around to step 336.

In the case in which the definition of the elements which constitute the spreadsheet is terminated, the values of the attributes of the tuples of the various entities selected which comply with the selection criteria are extracted from the data base in step 339 in order to initialize the cells of this spreadsheet. Several saving and conversion possibilities are then offered in step 340 in order to allow the utilization of this spreadsheet in various commercial spreadsheet programs, and to allow the addition of other cells if necessary.

A historical report of the selections, in which all the selections are memorized, is constituted at each step. It is saved with the spreadsheet created. This makes it possible to backtrack step by step through the selections made at any moment in the creation of a spreadsheet and/or to modify an already existing spreadsheet.

The process will now be described in accordance with an example based on the model and graph in FIG. 1. The user desires to carry out a study of the salaries, ages, and competencies of certain employees working in departments which develop products of the office automation and graphics types.

In order to start the process, he loads into memory the model which corresponds to the company he is studying. Then, he designates the entity PRODUCT 10, which then becomes the root of the spreadsheet. In conformity with step 313, the set of the attributes of this entity, for example prod_name 101, prod_type 102 and prod_ref 103 for the name, type and reference number of the product, are displayed. The user chooses the attribute prod_type 102, and the list of the values assumed by this attribute in the subjacent relation of the database is then offered to him in another window (step 315). He then selects the elements which interest him, office automation 220, and graphics 221 in this case, and validates the selection, which causes this window to close. Methods of validation, for example by means of keys, are well known in the prior art of user interfaces.

After this first selection step, a control window, which can appear in icon form, is opened, and it shows the status of the spreadsheet as in FIG. 4a. This window is updated at each step, and it makes it possible to immediately verify the result and thus to detect inconsistencies or errors. In the mode in which a historical report of the selections is maintained, it also makes it possible to visualize the backtracking that occurs during corrections or modifications.

The user terminates the selection of attributes in step 318, but decides in step 319 to proceed with the selection of the abscissa entities. In step 320, the color of the entity PRODUCT 10 is then modified, as is the color of the entities ORDER 16, SUPPLIER 17, and DEPT 11, linked to it by relationships. The tint of the first entity, PRODUCT 10, distinguishes it as already having been selected, and that of the subsequent entities, which is different, shows them to be among the possible selections.

The user then clicks on the entity DEPT 11, for which he chooses the attribute dept# 110. The numbers of the departments which produce products of the office automation type are presented to him first, followed by those of the departments which produce products of the graphics type, from among which he selects, respectively, departments #1 and #2, then #3 and #4. FIG. 4b shows the status of the control window. After the modification of the colors of the objects in the graph during step 320, there is a wraparound to step 311, the entities which may be selected then being EMPLOYEE 12 and SUPERVISOR 18. The choice is now that of the entity EMPLOYEE 12 and its attribute empl_name 121. The user selects the names of the employees which interest him from among those working in departments #1, #2, #3 and then #4, which are offered to him in turn in accordance with the pieces of information stored in the database. His choice is then based, respectively, on e1 and e2, e3 and e4, e5 and e6, and finally on e7, which is immediately transcribed in the control window as in FIG. 4c.

Figure 4E:
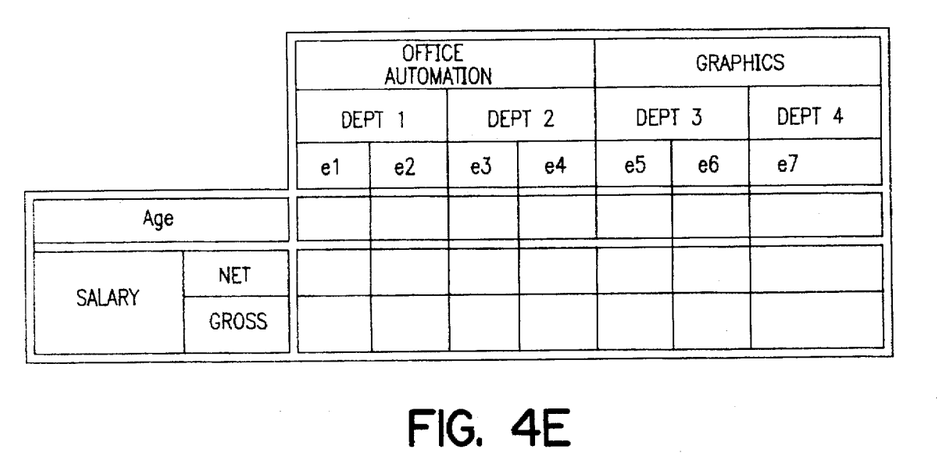

Having arrived at the level of the characteristics on which the study is based, he chooses in step 319 to plot them on the ordinate. He is interested in the age, or the attribute empl_age 122 (FIG. 1), of these employees, an attribute which he therefore selects in step 331. This choice brings about an update in step 333, which is reflected in the control window, as in FIG. 4d. With step 336, he selects other entities such as the entity SALARY 13 (FIG. 1) and its two attributes sal_gros 131 and sal_net, as illustrated in FIG. 4e. In order to finish, he selects the entity COMPETENCY 14 and its attribute comp_type 141, which results in the spreadsheet in FIG. 4f. Then he has all the elements required and he can decide in step 335 to conclude the selections. The corresponding data are extracted from the database and they make it possible to initialize the cells of this spreadsheet. The spreadsheet can be saved in an appropriate form or even converted into the format of a commercial spreadsheet program for utilization.

During the selection of the values of the attributes to be plotted on the abscissa, step 316, the use of functions called selection functions is authorized in order to facilitate the procedure.

Generally, these functions are written in a dialogue box provided for this purpose in the window for selecting the values, in the form:

attrib op val in which attrib is the name of an attribute of the current entity, op an operator from among =, <, >, <= and >=, and val a constant value. In the case of attributes of the numerical type (whole, floating), these operators have their mathematical meaning; in the case of attributes of the alphanumeric type, only the sign = is authorized, and it corresponds to an equality of the strings, character by character. The value must be in conformity with the type of the attribute to which it is compared, truncation signs and replacement character signs, for example the signs + and ?, being allowed in alphanumeric cases.

The following examples correspond to situations in which the user in the preceding example is interested in all the employees over 50 years of age whose names begin with the letters "stan." When the window for selecting the names of the employees working in the various departments is displayed, he enters:

empl_age>50 or empl_name=stan+ in the dialogue box provided. All the names of the employees which meet the criterion entered are then automatically selected.

RDBMSs generally allow the management of a certain number of constraints on the data stored in the base. Some of them are intrinsic to the relational model (unity of the primary keys, for example) and guarantee its integrity; others can be defined by the user in order to model the actual conditions under which the data in the base change. When one of these constraints is violated, several measures are possible, for example a displaying of a clamp on message or a rejection of the data which caused this violation. In order to meet this need, the entity-relationship model was extended so as to make the existence of these constraints defined by the user appear in its graphic representation.

Figure 5:
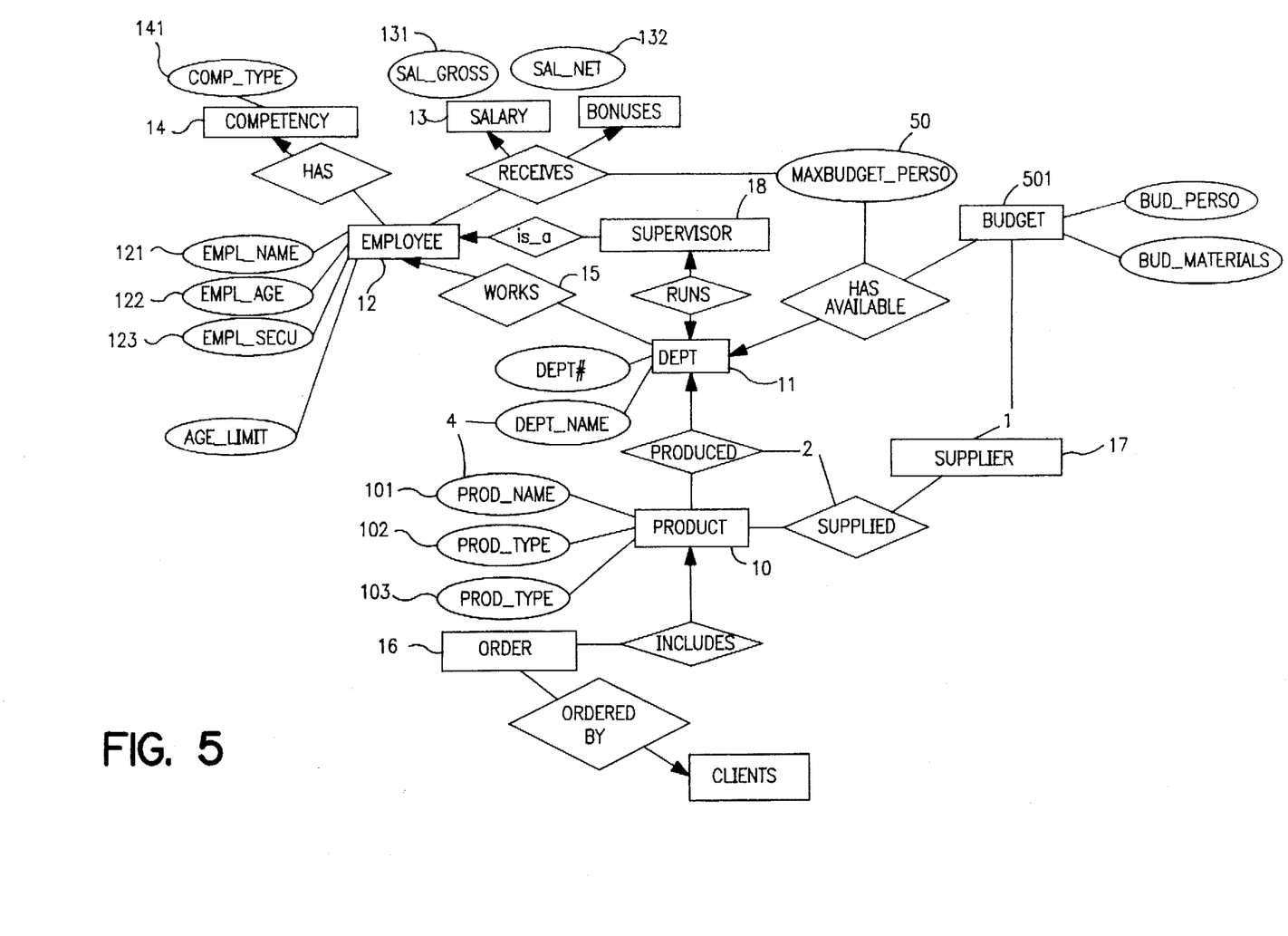
FIG. 5 represents another example of an entity-relationship graph which includes constraints associated with entities and relationships.

FIG. 5 shows the example of the model of the company in FIG. 1 to which have been added constraints of various types, which are represented by darkened ellipses, and linked to the entity, relationship or attribute elements to which they relate. The constraint age_limit 51 expresses the fact that the age of an employee is necessarily between 16 and 65. It makes it possible to detect a potential inconsistency at this level. The entity BUDGET 501, whose attributes are, for example, bud_perso, bud_mat, etc. which correspond to the personnel, materials, and other budgets, and the relationship [Has available] 502 makes it possible to introduce a more global constraint max_budget_perso 50 which links this same relationship "Has available" to the relationship "Receives" and which reflects the limitation of the sum of the amounts received by all the employees in a particular department as a function of the expenses budget for the personnel allocated to this department.

In the process of the invention, the constraints linked to entities or relationships, which are part of the selection, can be associated with the spreadsheet being created. The program described previously, which supports the selection actions, in effect allows the user making use of a graph which contains such relationships to incorporate them into this spreadsheet. In order to do this, a series of supplementary steps, which are incorporated between steps 339 and 340, make it possible to display objects in the graph which represent these constraints relating to the elements selected, and to then choose those among them which must be applied to the data in the spreadsheet. The expressions of these constraints and the data necessary for their application are memorized with the structure and the data of this spreadsheet. Later they are converted, insofar as possible, into the language of the spreadsheet program used, in order to be applied, depending on the case, to single cells, to rows, to entire columns, or even to the entire spreadsheet.

Returning to the example illustrated in FIGS. 4a through 4f, if the constraints age_limit 51 and max_budget_perso 52 are selected, they are then included in the spreadsheet. The first is applied cell by cell to the row on which the employees' ages have been plotted (reference 40, FIG. 4f), the second, on the other hand, is applied to the row with the gross salaries, considering the designated employees in each department. It is clear that, in the absence of certain data, in this case those of the entity BUDGET but also the salaries and bonuses of each of the employees in each department in question, this constraint is inapplicable in a spreadsheet program which only has knowledge of the spreadsheet created. Two solutions make it possible to solve this problem: the first consists of extracting the necessary missing data and saving them together with the expression of the constraint; a second would be to provide for an inquiry of the data base at each modification in the spreadsheet program of the data in a cell of the spreadsheet in question by such a constraint.

Figure 4F:
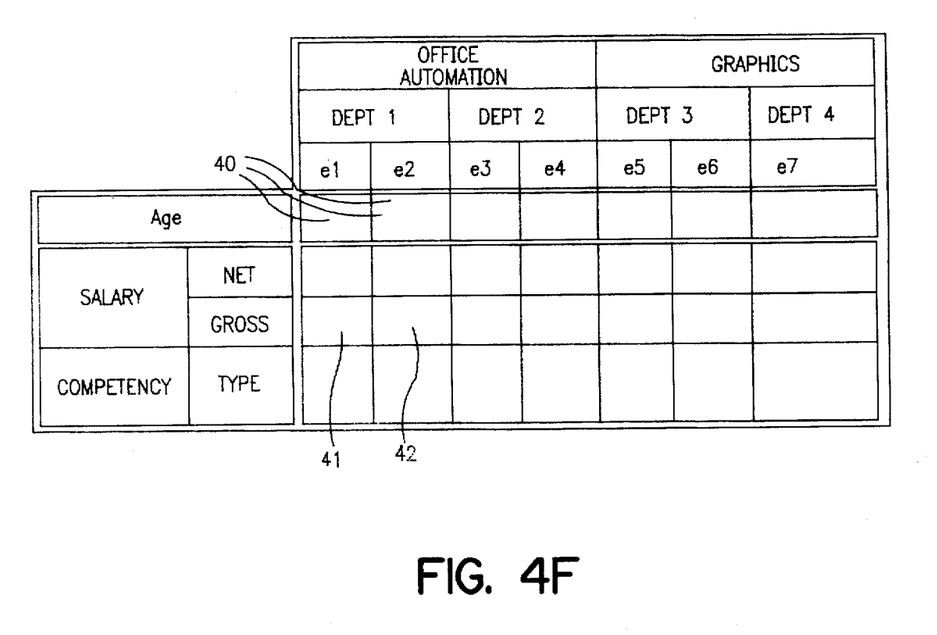

This second solution, which is very costly, is not feasible in the majority of cases. In this example, it is therefore easier to extract the salary and bonus data for each of the non-designated employees in departments #1 through #4, to determine the sum of these for each of these departments, to extract the total from the personnel budget of each of these departments, and to associate with the cells of the spreadsheet the constraints derived from the initial constraint max_budget_perso 52. If, for example, the budget allocated for the personnel in department #1 is called budget#1, and the sum of the gross salaries and bonuses received by the employees other than e1 and e2 working in this department is called sum#1, the constraint "<=budget#1−sum#1−(42)"

is associated with the cell 41, and the constraint

"<=budget#1−sum#2−(41)"

is associated with the cell 42. Here (41) and (42) designate the values contained by the cells 41 and 42, respectively.

The invention uses an information system composed of a screen, a keyboard, a pointing peripheral such as a mouse, a central processing unit which supports at least one memory and one or more processors, and one or more mass storage media, for example magnetic hard disks or optical disks, this system allowing the execution of a program for generating spreadsheets according to the process described for assisting in decision-making.

This system includes storage means for a relational data base which contains the pieces of information relating to the application field described by an entity-relationship model, and means for representing the corresponding entity-relationship graph on the screen, this graph including objects representing entities, relationships, constraints which are linked to them, and lines which link these objects to one another.

It also includes means for interfacing with the mouse and the keyboard which allow the selection from the graph of the entities and relationships which describe the elements to be considered during the decision-making study.

The automatic generation of spreadsheets, which has a structure corresponding to the entities and relationships selected, and which associates the constraints present in the module with their cells in conformity with the process described, is also supported by means for overlaying the values contained is the data base. Means for converting the spreadsheets created into the format of a spreadsheet program, with a view to their utilization in this program, then allow the presentation of the data in various forms (pie-charts, curves, histograms, etc.) and of the simulations which comply with the constraints of the model. The integration of all these elements for the purpose of utilizing the data therefore facilitates the forecasting of the impact of decisions, thanks to the process for the automatic generation of spreadsheets.

Other modifications within reach of one skilled in the art are also part of the spirit of the invention.

We claim:

1. A process implemented on a graphical user interface for the automatic generation of a spreadsheet from a model of an entity-relationship type which serves as a support for a relational data base model, comprising the steps of displaying said data base model of the entity-relationship type on a screen of an information system in the form of a graph composed of a plurality of entities and relationships represented respectively by first and second types of objects and linked by lines, said graph being physically embodied in memory by a set of relational tables, and automatically defining said spreadsheet by selection, from among various types of objects in said graph, of elements which are memorized to enable plotting of abscissa and ordinate data of the graph and compose the contents of cells of the spreadsheet thus formed.

2. The process according to claim 1, in which the selection of the elements which compose the spreadsheet comprising selecting a first set of entities in a first phase such that a path formed by said entities and the relationships which link said entities does not include any loops, one end of said path being designated as a root and another end of said path being designated as a branch, and selection of a second set of entities linked by relationships to the branch in a second phase, and, for each of the entities in the first set, when it is indicated for selection, displaying a list of its attributes, selecting at least one attribute from said list of attributes and for each of the attributes selected, plotting on the abscissa, in hierarchical levels corresponding to a tree structure between the entities of the abscissas, the values of attributes extracted from the data base, and plotting non-selected attributes of the entity branch and the attributes of the entities in the second set on the ordinate in hierarchical levels corresponding to a tree structure between the entities of the ordinates, and intializing the cells thus formed with values of said attributes extracted from the data base.

3. The process according to claim 2, further comprising showning in the graph the attributes of the entities and relationships which compose it, in the form of objects of a third type, and selecting the objects directly.

4. The process according to claim 2, wherein the range of the values assumed by the attributes to be plotted on the abscissa is limited, by pinpoint choices or by limitation functions, and further wherein, in the same way, the user selects a number of attributes to be plotted on the ordinate, from among the set of attributes of the branch and those of the entities linked by relationships to said branch.

5. The process according to claim 2, wherein all objects which form the graph are at first displayed in a first color, then in the course of the selection the objects selected are displayed in a second color.

6. The process according to claim 5, wherein at every moment in the selection phases, the objects which may be selected are displayed in a third color.

7. The process according to claim 5, wherein said colors comprise variations in brightness.

8. The process according to claim 6, wherein said colors comprise variations in blinking frequencies.

9. The process according to claim 2, further comprising constituting a historical report of the selections which contains each of the selection steps and to backtrack step by step through said selections.

10. The process according to claim 2, wherein the selection includes a step for validation of a current entity selected in order to verify: during the first phase, whether a relationship links said current entity in the graph to a preceding entity selected, and in the second phase, whether a relationship links said current entity in the graph to the branch, said relationships being physically embodied in memory by tables to effect, at the level of the RDBMS, a joining of the tables corresponding to these entities.

11. The process according to claim 1, wherein said model includes expression of constraints with which various entities and relationships composing said model comply, and the constraints associated with the entities and relationships selected are automatically linked to the cells of the spreadsheets thus generated.

12. The process according to claim 1, wherein said model is a model of a company.

13. A device to assist in decision-making from a model of an application field in the form of an entity-relationship graph containing entities, relationships, and constraints which are linked to them, which includes: storage means for a data base described by said model containing pieces of information corresponding to said application field, means for the graphic representation on the screen of said entity-relationship graph, which includes objects representing entities, relationships, constraints which are linked to said objects, and lines which link said objects to one another, said device including: interface means for the selection from the graph of entities and relationships which describe the elements to be considered during a decision-making study, means for the automatic generation of a spreadsheet which has a structure corresponding to the entities and relationships selected and which associate the constraints present in the model with their cells, and means for overlaying values contained in the data base which correspond to the elements selected, to enable initialization of said spreadsheet.

14. The device to assist in decision-making according to claim 13, further including means for converting the spreadsheet created into a spreadsheet program format for utilization of said spreadsheet in a program to allow the presentation of data in the form of graphics and of the simulations which comply with the constraints for utilizing the data and forecasting impact of decisions.

* * * * *